US011595990B2

(12) United States Patent
Yoo et al.

(10) Patent No.: US 11,595,990 B2
(45) Date of Patent: Feb. 28, 2023

(54) METHODS AND APPARATUS FOR TRANSMITTING RACH IN WIRELESS COMMUNICATION SYSTEM

(71) Applicant: Samsung Electronics Co., Ltd., Suwon-si (KR)

(72) Inventors: Hyunil Yoo, Suwon-si (KR); Taeyoung Kim, Seoul (KR); Hyungju Nam, Gwangmyeong-si (KR); Jeehwan Noh, Suwon-si (KR); Yeohun Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/193,726

(22) Filed: Nov. 16, 2018

(65) Prior Publication Data

US 2019/0159244 A1 May 23, 2019

(30) Foreign Application Priority Data

Nov. 17, 2017 (KR) .......................... 10-2017-0153933

(51) Int. Cl.
*H04W 74/00* (2009.01)
*H04L 5/00* (2006.01)
*H04W 74/08* (2009.01)

(52) U.S. Cl.
CPC ......... *H04W 74/006* (2013.01); *H04L 5/0053* (2013.01); *H04L 5/0092* (2013.01);
(Continued)

(58) Field of Classification Search
CPC ........... H04W 74/006; H04W 74/0833; H04W 74/08; H04L 5/0053; H04L 5/0092; H04L 5/0007
See application file for complete search history.

(56) References Cited

U.S. PATENT DOCUMENTS 10,491,358 B2 * 11/2019 Son .................. H04W 48/12
2014/0254515 A1 9/2014 Kim et al.
(Continued)

FOREIGN PATENT DOCUMENTS

| EP | 3471497 A1 | 4/2019 |
| KR | 10-2013-0031126 A | 3/2013 |
| WO | 2017/035698 A1 | 3/2017 |

OTHER PUBLICATIONS

Ericsson, "Preamble modelling and configuration with multiple SSBs", 3GPP TSG-RAN WG2 #99bis, Oct. 9-13, 2017, 4 pages, Tdoc R2-1711176.

(Continued)

*Primary Examiner* — Joshua Kading

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a terminal in a wireless communication system includes receiving configuration information regarding a random access channel (RACH) from a base station, and transmitting a RACH preamble based on the configuration information. The configuration information includes information indicating the number of RACH transmission occasions in a frequency axis. A terminal includes a processor configured to receive configuration information regarding a RACH from a base station, and transmit a RACH preamble according to the configuration information, wherein the configuration information includes information indicating the number of RACH transmission occasions in a frequency axis.

14 Claims, 16 Drawing Sheets

(52) U.S. Cl.
CPC ....... *H04W 74/0833* (2013.01); *H04L 5/0007* (2013.01); *H04W 74/08* (2013.01)

(56) References Cited

U.S. PATENT DOCUMENTS

| | | | |
|---|---|---|---|
| 2017/0078933 A1 | 3/2017 | Li et al. | |
| 2017/0238344 A1* | 8/2017 | McGowan | H04L 5/0007 370/329 |
| 2017/0367003 A1* | 12/2017 | Zhang | H04W 84/045 |
| 2018/0092027 A1* | 3/2018 | Sheng | H04W 48/08 |
| 2018/0092064 A1* | 3/2018 | Ryu | H04L 27/2692 |
| 2018/0192440 A1 | 7/2018 | Huang et al. | |
| 2019/0110313 A1* | 4/2019 | Islam | H04W 74/0833 |
| 2019/0110319 A1* | 4/2019 | Tokgoz | H04W 72/0453 |
| 2019/0150190 A1* | 5/2019 | Kim | H04W 56/00 370/329 |
| 2019/0230696 A1* | 7/2019 | Kim | H04L 5/0053 |
| 2019/0274172 A1* | 9/2019 | Yoon | H04W 74/0833 |
| 2019/0281624 A1* | 9/2019 | Kim | H04W 74/08 |
| 2020/0146057 A1* | 5/2020 | Jeon | H04W 74/006 |
| 2020/0329503 A1* | 10/2020 | Da Silva | H04W 72/02 |
| 2021/0007065 A1* | 1/2021 | Ko | H04L 5/0051 |
| 2021/0068160 A1* | 3/2021 | Takahashi | H04L 5/005 |

OTHER PUBLICATIONS

LG Electronics Inc, "Considerations for RA-RNTI calculation", 3GPP TSG-RAN WG2 Meeting #99bis, Oct. 9-13, 2017, 4 pages, R2-1711609.
International Search Report dated Feb. 15, 2019 in connection with International Patent Application No. PCT/KR2018/014031, 3 pages.
Written Opinion of the International Searching Authority dated Feb. 15, 2019 in connection with International Patent Application No. PCT/KR2018/014031, 5 pages.
Supplementary European Search Report dated Oct. 26, 2020 in connection with European Application No. 18879546.2, 12 pages.
Ericsson, "Remaining details on NR-RACH configurations and formats," R1-1716154, 3GPP TSG RAN WG1 NR Ad-Hoc#3, Nagoya, Japan, Sep. 18-21, 2017, 21 pages.
Ericsson, "Remaining details on PRACH formats," R1-1718715, 3GPP TSG RAN WG1 Meeting #90bis, Prague, Czech Republic, Oct. 9-13, 2017, 20 pages.
Ericsson, "Remaining details on RACH procedure," R1-1718716, 3GPP TSG RAN WG1 Meeting #90bis, Prague, Czech Republic, Oct. 9-13, 2017, 21 pages.
Notice of Preliminary Rejection dated Nov. 17, 2021, in connection with Korean Application No. 10-2017-0153933, 16 pages.
Ericsson, "Remaining details on RACH procedure," R1-1718716, 3GPP TSG RAN WG1 Meeting #90bis, Prague, Czech Republic, Oct. 9-13, 2017, 17 pages.
Ericsson, "Remaining details on NR-RACH configurations and formats," R1-1716154, 3GPP TSG RAN WG1 NR Ad-Hoc#3, Nagoya, Japan, Sep. 18-21, 2017, 20 pages.
Notice of Preliminary Rejection dated May 24, 2022, in connection with Korean Application No. 10-2017-0153933, 14 pages.
Examination report dated May 15, 2022, in connection with Indian Application No. 202037020481, 6 pages.
Ericsson, "Text Proposal for L1 parameters for 38.331," Tdoc R2-1711969, 3GPP TSG-RAN WG2 #99bis, Prague, Czech Republic, Oct. 9-13, 2017, 27 pages.
Office Action dated Dec. 14, 2022 in connection with European Patent Application No. 18 879 546.2, 6 pages.
Notice of Patent Grant dated Nov. 16, 2022 in connection with Korean Patent Application No. 10-2017-0153933, 5 pages.
Ericsson, "Remaining details on PRACH formats", 3GPP TSG RAN WG1 Meeting #90bis, Oct. 9-13, 2017, R1-1718715, 20 pages.

* cited by examiner

METHODS AND APPARATUS FOR TRANSMITTING RACH IN WIRELESS COMMUNICATION SYSTEM

CROSS-REFERENCE TO RELATED APPLICATION

This application is based on and claims priority under 35 U.S.C. § 119 to Korean Patent Application No. 10-2017-0153933, filed on Nov. 17, 2017, in the Korean Intellectual Property Office, the disclosure of which is incorporated by reference herein in its entirety.

BACKGROUND

1. Field

The present disclosure relates in general to a wireless communication system, and in particular to a method and apparatus for transmitting a Random Access CHannel (RACH) in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Based on the above discussion, the present disclosure is derived to solve the aforementioned problems in a wireless communication system, and aims to provide a method and apparatus for transmitting a Random Access CHannel (RACH) considering beamforming as one of features of a $5^{th}$ Generation (5G) communication system.

In order to solve the aforementioned problem, a method of operating a terminal according to an embodiment of the present disclosure may include receiving configuration information regarding a random access channel (RACH) from a base station, and transmitting a RACH preamble according to the configuration information. Herein, the configuration information may include information indicating the number of RACH transmission occasions in a frequency axis.

According to the present disclosure, in a system operating at above 6 GHz or below 6 GHz and considering beamforming, a base station and a terminal may transmit a RACH according to a preamble format and a RACH resource configuration.

Advantages acquired in the present disclosure are not limited to the aforementioned advantages. Other advantages not mentioned herein can be clearly understood by those skilled in the art to which the present disclosure pertains from the following descriptions.

A method for operating a terminal in a wireless communication system is provided. The method includes receiving configuration information regarding a random access channel (RACH) from a base station, and transmitting a RACH preamble based on the configuration information. The configuration information includes first information indicating the number of RACH transmission occasions in a frequency axis, and second information indicating a start symbol of the RACH.

A terminal in a wireless communication system is provided. The terminal includes a transceiver, and at least one processor coupled to the transceiver. The at least one processor configured to receive configuration information regarding a RACH from a base station, and transmit a RACH preamble based on the configuration information. The configuration information includes first information indicating the number of RACH transmission occasions in a frequency axis, and second information indicating a start symbol of the RACH.

A method for operating a base station in a wireless communication system is provided. The method includes transmitting configuration information regarding a RACH to a UE, and receiving a RACH preamble based on the configuration information. The configuration information includes first information indicating the number of RACH transmission occasions in a frequency axis and second information indicating a start symbol of the RACH.

A base station in a wireless communication system is provided. The base station includes a transceiver, and at least one processor coupled to the transceiver. The at least one processor is configured to transmit configuration information regarding a RACH to a UE, and receive a RACH preamble based on the configuration information. The configuration information includes first information indicating the number of RACH transmission occasions in a frequency axis and second information indicating a start symbol of the RACH.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
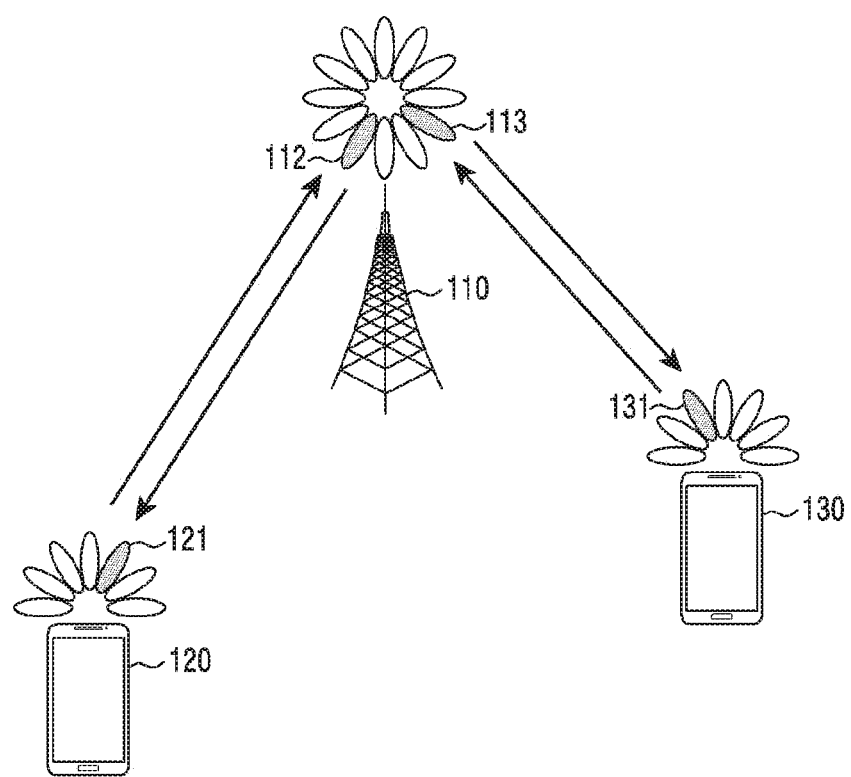
FIG. 1 illustrates an exemplary wireless communication system according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Exemplary embodiments of the present disclosure will be described herein below with reference to the accompanying drawings. Further, in the following description of the present disclosure, well-known functions or constructions are not described in detail since they would obscure the disclosure in unnecessary detail. Also, the terms used herein are defined according to the functions of the present disclosure, and thus may vary depending on user's or operator's intention and usage. Therefore, the definition of the terms used herein must be understood based on the descriptions made herein.

Advantages and features of the present disclosure, and a method for achieving them will become apparent with reference to embodiments described in detail below with reference to the accompanying drawings. However, the present disclosure may be embodied in various different forms without being limited to embodiments described below. Rather, the present embodiments are provided so that the present disclosure will be completely disclosed, and will fully convey the concept of the disclosure to those skilled in the art. The present disclosure is defined only by the scope of claims. Like reference numerals refer to like elements throughout the specification.

Terms used in the present disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present disclosure should not be interpreted to exclude the embodiments of the present disclosure.

A hardware-based approach is described for example in the various embodiments of the present disclosure described hereinafter. However, since the various embodiments of the present disclosure include a technique in which hardware and software are both used, a software-based approach is not excluded in the embodiments of the present disclosure.

Hereinafter, the present disclosure relates to a method and apparatus for transmitting a Random Access CHannel (RACH) in a wireless communication system. In addition, the present disclosure relates to resource allocation for a random access procedure during an initial access process based on beamforming.

Terms used hereinafter to refer to a signal, a channel, control information, network entities, a component of a device, or the like are exemplified for convenience of explanation. Therefore, the present disclosure is not limited to the terms described below, and thus other terms have the same technical meaning may also be used.

In addition, although the present disclosure also describes various embodiments by using terms used in some communication standards (e.g., $3^{rd}$ Generation Partnership Project (3GPP)), this is for exemplary purposes only. Various embodiments of the present disclosure may be easily modified, and thus may also be applied to other communication systems.

FIG. 1 illustrates a wireless communication system according to various embodiments of the present disclosure. As part of nodes which use a wireless channel in a wireless communication system, a base station 110, a terminal 120, and a terminal 130 are exemplified in FIG. 1. Although only one base station is illustrated in FIG. 1, another base station identical to or different from the base station 110 may be further included.

The base station 110 is a network infrastructure which provides a radio access to the terminals 120 to 130. The base station 110 has a coverage defined as a specific geographic region on the basis of a distance in which a signal can be transmitted. In addition to the term 'base station', the base station 110 may be referred to as an 'Access Point (AP)', an 'eNodeB (eNB)', a '$5^{th}$ Generation (5G) node', a 'wireless point', a 'Transmission/Reception Point (TRP)', or other terms having equivalent technical meanings.

As a device used by a user, each of the terminals 120 to 130 communicate with the base station 110 through the wireless channel. Optionally, at least one of the terminals 120 to 130 may be operated without user involvement. That is, as a device for performing Machine Type Communication (MTC), at least one of the terminals 120 to 130 may not be carried by the user. In addition to the term 'terminal', each of the terminals 120 to 130 may be referred to as a 'User Equipment (UE)', a 'mobile station', a 'subscriber station', a 'remote terminal', a 'wireless terminal', a 'user device', or other terms having equivalent technical meanings.

The base station 110, the terminal 120, and the terminal 130 may transmit and receive a radio signal at a millimeter Wave (mmWave) band (e.g., 28 GHz, 30 GHz, 38 GHz, 60 GHz). In this case, to improve a channel gain, the base station 110, the terminal 120, and the terminal 130 may perform beamforming. Herein, the beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a Quasi Co-Located (QCL) relation with a resource used to transmit the serving beams 112, 113, 121, and 131.

If large-scale characteristics of a channel which has delivered a symbol on a first antenna port can be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

Figure 2:
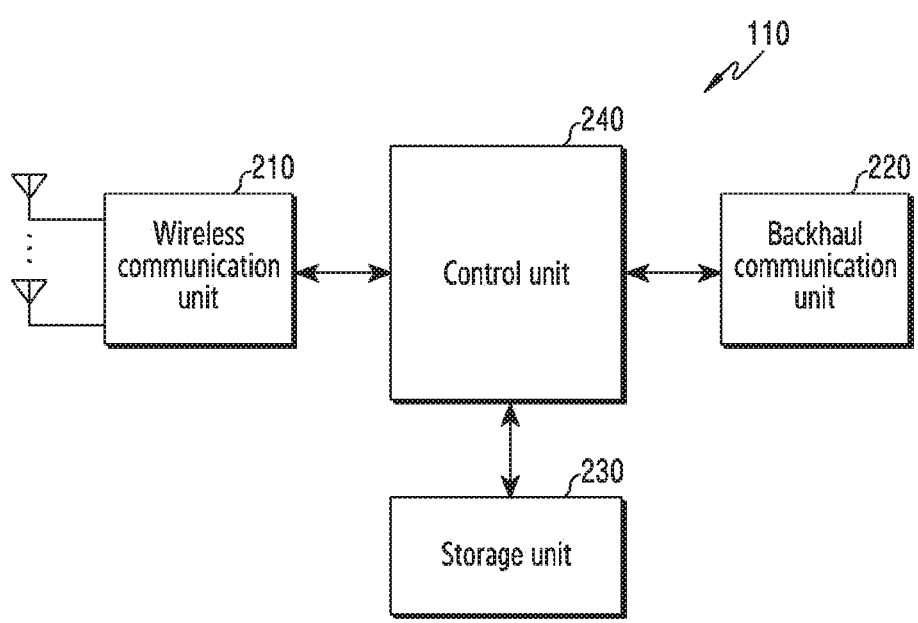
FIG. 2 illustrates an exemplary structure of a base station in a wireless communication system according to various embodiments of the present disclosure.

FIG. 2 illustrates a structure of a base station in a wireless communication system according to various embodiments of the present disclosure. The structure exemplified in FIG. 2 may be understood as a structure of the first base station 110. Hereinafter, the term '. . . unit', '. . . device', or the like implies a unit of processing at least one function or operation, and may be implemented in hardware or software or in combination of the hardware and the software.

Referring to FIG. 2, the base station includes a wireless communication unit 210, a backhaul communication unit 220, a storage unit 230, and a control unit 240.

The wireless communication unit 210 performs functions for transmitting and receiving a signal through a wireless channel. For example, the wireless communication unit 210 performs a function of conversion between a baseband signal and a bit-stream according to a physical layer standard of a system. For example, in data transmission, the wireless communication unit 210 generates complex symbols by coding and modulating a transmission bit-stream. In addition, in data reception, the wireless communication unit 210 restores a reception bit-stream by demodulating and decoding a baseband signal.

In addition, the wireless communication unit 210 up-converts a baseband signal into a Radio Frequency (RF) signal and thereafter transmits it through an antenna, and down-converts an RF signal received through the antenna into a baseband signal. For this, the wireless communication unit 210 may include a transmission filter, a reception filter, an amplifier, a mixer, an oscillator, a Digital to Analog Converter (DAC), an Analog to Digital Converter (ADC), or the like. In addition, the wireless communication unit 210 may include a plurality of transmission/reception paths. Further, the wireless communication unit 210 may include at least one antenna array constructed of a plurality of antenna elements.

From a hardware aspect, the wireless communication unit 210 may be constructed of a digital unit and an analog unit, and the analog unit may be constructed of a plurality of sub-units according to operating power, operation frequency, or the like. The digital unit may be implemented with at least one processor (e.g., a Digital Signal Processor (DSP)).

The wireless communication unit 210 transmits and receives a signal as described above. Accordingly, the wireless communication unit 210 may be referred to as a transmitter, a receiver, or a transceiver. In addition, in the following description, transmission and reception performed through a wireless channel are used to imply that the aforementioned processing is performed by the wireless communication unit 210.

The backhaul communication unit 220 provides an interface for preforming communication with different nodes in a network. That is, the backhaul communication unit 220 converts a bit-stream transmitted from the base station to a different node, e.g., a different access node, a different base station, an upper node, a core network, or the like, into a physical signal, and converts a physical signal received from the different node into a bit-stream.

The storage unit 230 stores data such as a basic program, application program, configuration information, or the like for an operation of the base station. The storage unit 230 may be constructed of a volatile memory, a non-volatile memory, or a combination of the volatile memory and the non-volatile memory. In addition, the storage unit 230 provides the stored data according to a request of the control unit 240.

The control unit 240 controls overall operations of the base station. For example, the control unit 240 may transmit and receive a signal via the wireless communication unit 210 or the backhaul communication unit 220. In addition, the control unit 240 writes data to the storage unit 230, and reads the data. Further, the control unit 240 may perform functions of a protocol stack required in a communication standard. According to another exemplary implementation, the protocol stack may be included in the wireless communication unit 210. For this, the control unit 240 may include at least one processor. According to various embodiments, the control unit 240 may control the base station to perform operations according to various embodiments described below.

Figure 3:
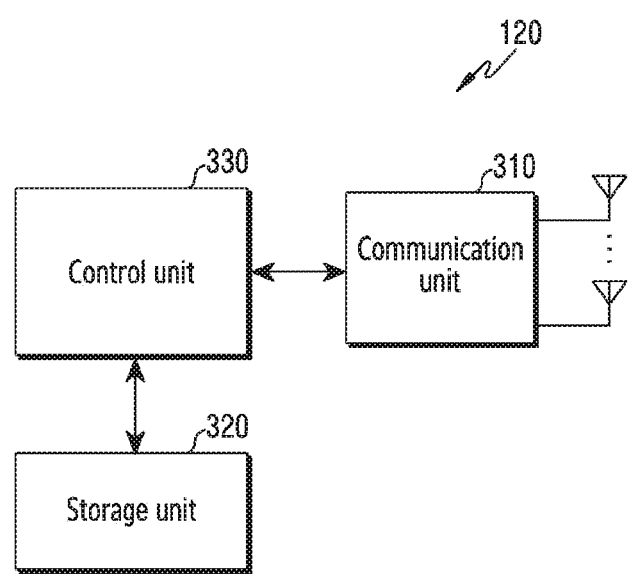
FIG. 3 illustrates an exemplary structure of a terminal in a wireless communication system according to various embodiments of the present disclosure.

FIG. 3 illustrates a structure of a terminal in a wireless communication system according to various embodiments of the present disclosure. The structure exemplified in FIG. 3 may be understood as a structure of the terminal 120. Hereinafter, the term ' . . . unit', ' . . . device', or the like implies a unit of processing at least one function or operation, and may be implemented in hardware or software or in combination of the hardware and the software.

Referring to FIG. 3, the terminal includes a communication unit 310, a storage unit 320, and a control unit 330.

The communication unit 310 performs functions for transmitting and receiving a signal through a wireless channel. For example, the communication unit 310 performs a function of conversion between a baseband signal and a bit-stream according to a physical layer standard of a system. For example, in data transmission, the communication unit 310 generates complex symbols by coding and modulating a transmission bit-stream. In addition, in data reception, the communication unit 310 restores a reception bit-stream by demodulating and decoding a baseband signal. In addition, the communication unit 310 up-converts a baseband signal into a Radio Frequency (RF) signal and thereafter transmits it through an antenna, and down-converts an RF signal received through the antenna into a baseband signal. For this, the communication unit 310 may include a transmission filter, a reception filter, an amplifier, a mixer, an oscillator, a DAC, an ADC, or the like.

In addition, the communication unit 310 may include a plurality of transmission/reception paths. Further, the communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). Herein, the digital and the analog circuit may be implemented as one package. In addition, the communication unit 310 may include a plurality of RF chains. Further, the communication unit 310 may perform beamforming.

The communication unit 310 transmits and receives a signal as described above. Accordingly, the communication unit 310 may be referred to as a transmitter, a receiver, or a transceiver. In addition, in the following description, transmission and reception performed through a wireless channel are used to imply that the aforementioned processing is performed by the communication unit 310.

The storage unit 320 stores data such as a basic program, application program, configuration information, or the like for an operation of the terminal. The storage unit 320 may be constructed of a volatile memory, a non-volatile memory, or a combination of the volatile memory and the non-volatile memory. In addition, the storage unit 320 provides the stored data according to a request of the control unit 330.

The control unit 330 controls overall operations of the terminal. For example, the control unit 330 may transmit and receive a signal via the communication unit 310. In addition, the control unit 330 writes data to the storage unit 320, and reads the data. Further, the control unit 330 may perform functions of a protocol stack required in a communication standard. For this, the control unit 330 may include at least one processor or micro-processor, or may be part of the processor. In addition, part of the communication unit 310 and the control unit 330 may be referred to as a Communication Processor (CP). According to various embodiments, the control unit 330 may control the terminal to perform operations according to various embodiments described below.

Figure 4A:
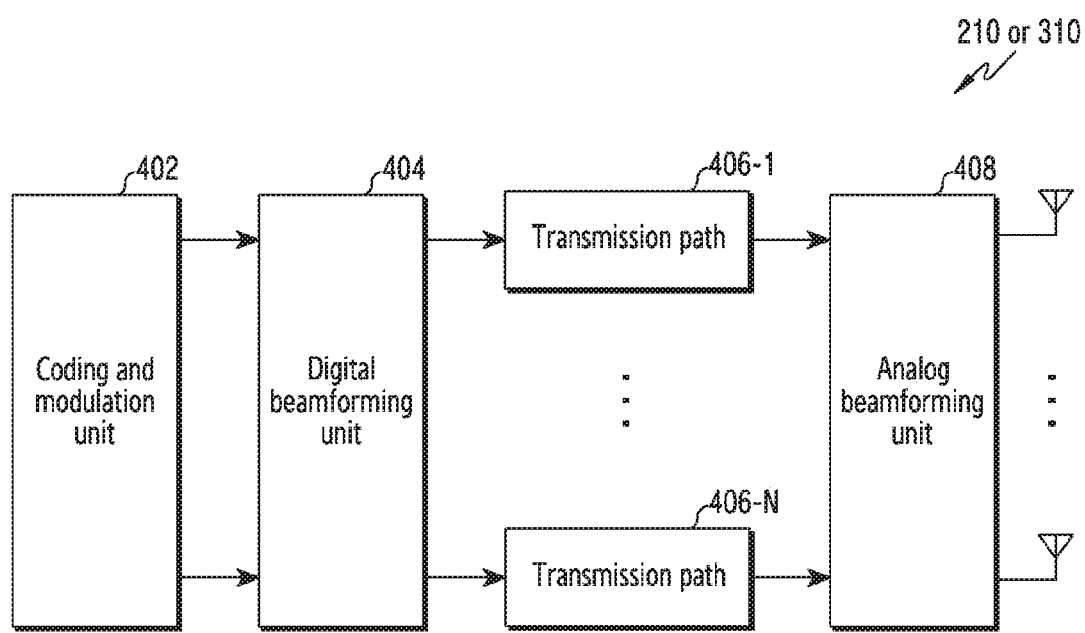
FIG. 4A to FIG. 4C illustrate exemplary structures of a communication unit in a wireless communication system according to various embodiments of the present disclosure.
Figure 4B:
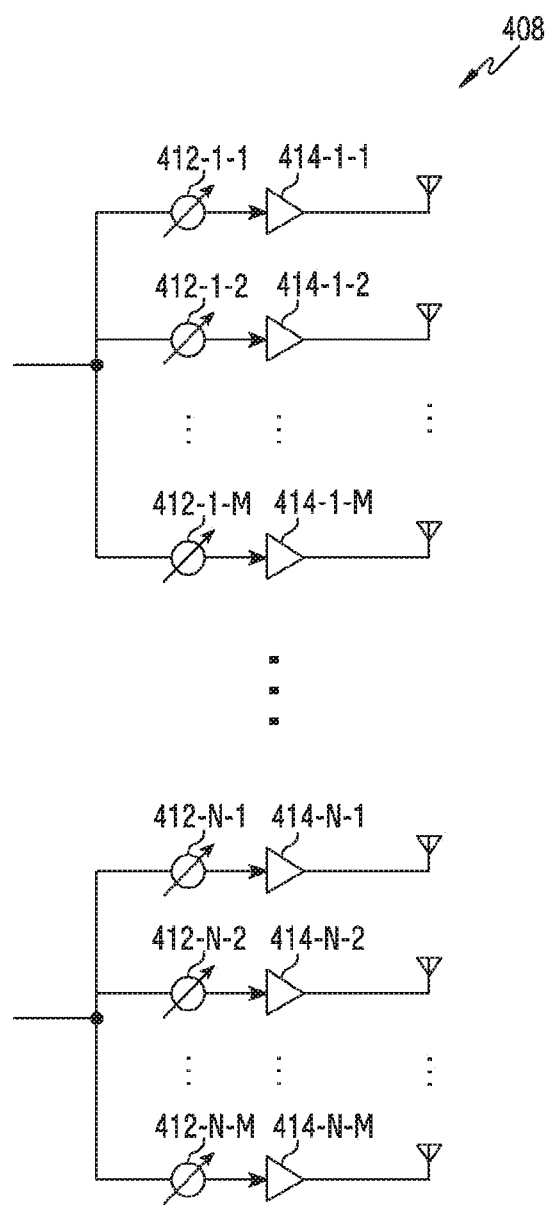
Figure 4C:
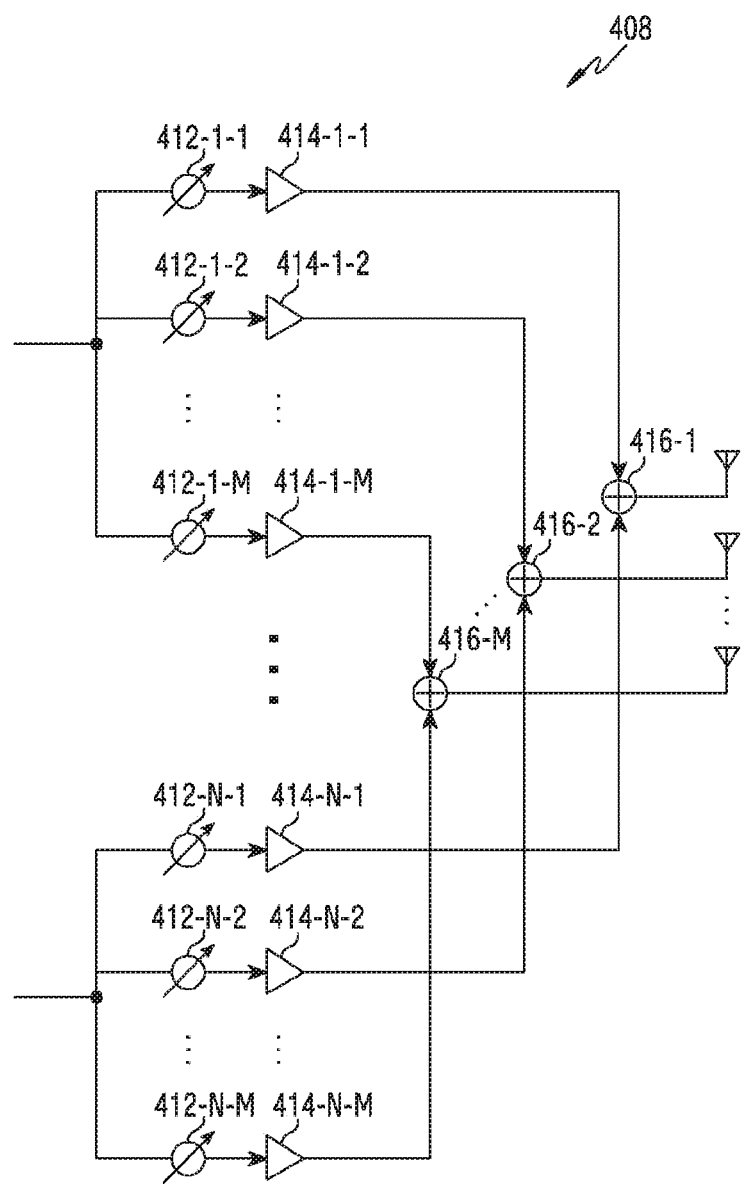

FIG. 4A to FIG. 4C illustrate a structure of a communication unit in a wireless communication system according to various embodiments of the present disclosure. An example for a detailed structure of the wireless communication unit 210 of FIG. 2 or the communication unit 310 of FIG. 3 is illustrated in FIG. 4A to FIG. 4C. Specifically, components for performing beamforming are exemplified in FIG. 4A to FIG. 4C, as part of the wireless communication unit 210 of FIG. 2 or the communication unit 310 of FIG. 3.

Referring to FIG. 4A, the wireless communication unit 210 or the communication unit 310 includes a coding and modulation unit 402, a digital beamforming unit 404, a plurality of transmission paths 406-1 to 406-N, and an analog beamforming unit 408.

The coding and modulation unit 402 performs channel encoding. For the channel encoding, at least one of a Low Density Parity Check (LDPC) code, a convolution code, and a polar code may be used. The coding and modulation unit 402 generates modulation symbols by performing constellation mapping.

The digital beamforming unit 404 performs beamforming on a digital signal (e.g., modulation symbols). For this, the digital beamforming unit 404 multiplies the modulation symbols by beamforming weights. Herein, the beamforming weights are used to change a magnitude and phase of a signal, and may be referred to as a 'precoding matrix', a 'precoder', or the like. The digital beamforming unit 404 outputs modulation symbols subjected to digital beamforming to the plurality of transmission paths 406-1 to 406-N. In this case, according to a Multiple Input Multiple Output (MIMO) transmission scheme, the modulation symbols may be multiplexed, or the same modulation symbols may be provided to the plurality of transmission paths 406-1 to 406-N.

The plurality of transmission paths 406-1 to 406-N convert the digital signals subjected to digital beamforming into an analog signal. For this, each of the plurality of transmission paths 406-1 to 406-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. That is, the plurality of transmission paths 406-1 to 406-N provide an independent signal processing process for a plurality of streams generated through digital beamforming. However, according to an implementation scheme, some of components of the plurality of transmission paths 406-1 to 406-N may be commonly used.

The analog beamforming unit 408 performs beamforming on an analog signal. For this, the digital beamforming unit 404 multiplies the analog signals by beamforming weights. Herein, the beamforming weights are used to change a magnitude and phase of a signal. Specifically, according to a connection structure between the plurality of transmission paths 406-1 to 406-N and antennas, the analog beamforming unit 408 may be configured as shown in FIG. 4B or FIG. 4C.

Referring to FIG. 4B, signals input to the analog beamforming unit 408 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by phase/magnitude modification units 412-1-1 to 412-1-M, is amplified by amplifiers 414-1-1 to 414-1-M, and thereafter are transmitted via the antennas.

Referring to FIG. 4C, signals input to the analog beamforming unit 408 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by the phase/magnitude modification units 412-1-1 to 412-1-M, and is amplified by the amplifiers 414-1-1 to 414-1-M. In addition, the amplified signals are added by adders 416-1-1 to 416-1-M with respect to an antenna element, and thereafter are transmitted via the antennas, so as to be transmitted via one antenna array.

An example in which an independent array is used for each transmission path is illustrated in FIG. 4B, and an example in which transmission paths share one antenna array is illustrated in FIG. 4C. However, according to another embodiment, some transmission paths may use an independent antenna array, and the remaining transmission paths may share one antenna array. Further, according to another embodiment, a structure which may change adaptively based on a situation may be used by applying a switchable structure between transmission paths and antenna arrays.

There are efforts made to develop a 5G communication system improved after commercialization of a 4G communication system.

A main feature of the 5G communication system is to support various service scenarios with different requirements in comparison with the 4G communication system. Herein, the requirement may imply a latency, a data rate, a battery life, or the like.

For example, an enhanced Mobile Broad Band (eMBB) service aims at a data rate which is 100 times higher than that of the 4G communication system, and may be regarded as a service for supporting rapidly growing user's data traffic. For another example, an Ultra Reliable and Low Latency Communication (URLLC) service aims at very high transmission/reception reliability and very low latency of data/control information in comparison with the 4G communication system. For another example, a massive Machine-Type-Communication (mMTC) service aims to support communication between a greater number of devices per single area, in comparison with the 4G communication system, and is a service evolved from 4G MTC such as smart metering.

Various services may coexist in the 4G wireless communication system. For example, a normal LTE cellular communication service, a Device-to-Device (D2D) communication service, a Machine-Type-Communication (MTC) service, a Multicast Broadcast Multimedia Service (MBMS) communication service, or the like may coexist. A terminal which supports these different services basically supports the normal LTE cellular service for a synchronization procedure with a base station and system information acquisition. For example, before acquiring system information related to a D2D operation (e.g., resource allocation information or the like used in the D2D operation) from the base station, a terminal which supports the D2D communication service performs a downlink synchronization process with the base station and acquires master system information (or a Master Information Block (MIB)). For another example, before acquiring system information related to MBMS reception (e.g., MBMS subframe information or the like) from the base station, a terminal which supports an MBMS communication service performs a downlink synchronization process with the base station and acquires master system information (or an MIB).

To support these different services, the conventional 4G system always uses the same subcarrier spacing (15 kHz), the same transmission bandwidth (72 subcarriers: 1.08 MHz), and the same FFT size (128 FFT size) to transmit a synchronous signal and system information irrespective of a bandwidth used in the system. Therefore, the terminal may receive the synchronization signal and the system information irrespective of a service (e.g., a D2D communication service, an MBMS communication service, etc.) supported by the terminal.

Unlike in the aforementioned 4G communication system, a 5G communication system may consider to use a numerology which differs for each service to meet a requirement which differs for each service. In this case, the numerology implies at least one of a subcarrier spacing, an Orthogonal Frequency Division Multiplexing (OFDM) symbol length (or a Single Carrier-Frequency Division Multiplexing (SC-FDM) symbol length), a transmission bandwidth, an FFT size, and a CP length. For example, at below 6 GHz, a numerology for transmitting a RACH uses a subcarrier spacing of {1.25/5} kHz in case of using a long sequence, and uses a subcarrier spacing of {15/30} kHz in case of using a short sequence. At above 6 GHz, only the short sequence is used, and in this case, only a subcarrier spacing of {60/120} kHz is applied. Each of Table 1 and Table 2 shows a RACH preamble format based on a sequence length applied in the 5G communication system. Table 1 shows a preamble format having a length of 839.

TABLE 1

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

Table 2 shows a preamble format having a length of 139.

TABLE 2

| Preamble format | # of Sequence | TCP | TSEQ | TGP | Maximum Cell radius (meter) |
|---|---|---|---|---|---|
| A | 0 | 1 | 144 | 2048 | 0 | 469 |
|   | 1 | 2 | 288 | 4096 | 0 | 938 |
|   | 2 | 4 | 576 | 8192 | 0 | 2,109 |
|   | 3 | 6 | 864 | 12288 | 0 | 3,516 |
| B | 1 | 2 | 216 | 4096 | 72 | 351 |
|   | 2 | 4 | 360 | 8192 | 216 | 1,055 |
|   | 3 | 6 | 504 | 12288 | 360 | 1,758 |
|   | 4 | 12 | 936 | 24576 | 792 | 3,867 |
| C | 0 | 1 | 1240 | 2048 | 0 | 5,300 |
|   | 2 | 2 | 2048 | 8192 | 0 | 9,245 |

As shown in Table 1 and Table 2 above, the RACH preamble format has several options according to several supported cell radiuses, and the preamble format of Table 2 corresponds to a subcarrier spacing of 15 kHz. In Table 2, up to a 4- or higher-fold option is required since a subcarrier spacing of {15/30/60/120} kHz is to be supported.

Table 3 shows a preamble format table including a sequence length of 139/839 and including all cases for each subcarrier, in a system of below 6 GHz/above 6 GHz. Table 3 shows a preamble format table design of 32 cases.

TABLE 3

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576k | 3168k | Type A, Type B |
| 1 | 839 | 1.25 kHz | 2*24576k | 21024k | Type A, Type B |
| 2 | 839 | 1.25 kHz | 4*24576k | 4688k | Type A, Type B |
| 3 | 839 | 5 kHz | 4*6144k | 3168k | Type A, Type B |
| 4(A0_15) | 139 | 15 kHz | 2048k | 144k | |
| A1_15 | 139 | 15 kHz | 2*2048k | 288k | |
| B1_15 | 139 | 15 kHz | 6*2048k | 504k | |
| A2_15 | 139 | 15 kHz | 4*2048k | 576k | |
| B2_15 | 139 | 15 kHz | 4*2048k | 360k | |
| A3_15 | 139 | 15 kHz | 6*2048k | 864k | |
| B3_15 | 139 | 15 kHz | 2*2048k | 216k | |
| 8(B4_15) | 139 | 15 kHz | 12*2048k | 936k | |
| 9(C0_15) | 139 | 15 kHz | 2048k | 1240k | |
| 10(C2_15) | 139 | 15 kHz | 4*2048k | 2048k | |
| 11(A0_30) | 139 | 30 kHz | 1024k | 72k | |
| A1_30 | 139 | 30 kHz | 1*2048k | 144k | |
| B1_30 | 139 | 30 kHz | 1*2048k | 108k | |
| A2_30 | 139 | 30 kHz | 2*2048k | 288k | |
| B2_30 | 139 | 30 kHz | 2*2048k | 180k | |
| A3_30 | 139 | 30 kHz | 3*2048k | 432k | |
| B3_30 | 139 | 30 kHz | 6*2048k | 468k | |
| 15(B4_30) | 139 | 30 kHz | 6*2048k | 468k | |
| 16(C0_30) | 139 | 30 kHz | 1024k | 620k | |
| 17(C2_30) | 139 | 30 kHz | 2*2048k | 1024k | |
| 18(A0_60) | 139 | 60 kHz | 512k | 36k | |
| A1_60 | 139 | 60 kHz | 1204k | 72k | |
| B1_60 | 139 | 60 kHz | 1024k | 54k | |
| A2_60 | 139 | 60 kHz | 2048k | 144k | |
| B2_60 | 139 | 60 kHz | 2048k | 90k | |
| A3_60 | 139 | 60 kHz | 1.5*2048k | 216k | |
| B3_60 | 139 | 60 kHz | 1.5*2048k | 126k | |
| 22(B4_60) | 139 | 60 kHz | 3*2048k | 234k | |
| 23(C0_60) | 139 | 60 kHz | 512k | 310k | |
| 24(C2_60) | 139 | 60 kHz | 2048k | 512k | |
| 25(A0_120) | 139 | 120 kHz | 256k | 18k | |
| 26 A1_120 | 139 | 120 kHz | 602k | 36k | |
| B1_120 | 139 | 120 kHz | 512k | 27k | |
| 27 A2_120 | 139 | 120 kHz | 1024k | 72k | |
| B2_120 | 139 | 120 kHz | 1024k | 45k | |
| 28 A3_120 | 139 | 120 kHz | 0.75*2048k | 108k | |
| B3_120 | 139 | 120 kHz | 0.75*2048k | 63k | |
| 29(B4_120) | 139 | 120 kHz | 1.5*2048k | 117k | |
| 30(C0_120) | 139 | 120 kHz | 256k | 155k | |
| 31(C2_120) | 139 | 120 kHz | 1204k | 256k | |

As shown in Table 3, five bits are required to express a preamble format. These five bits are transmitted by being included in a RACH configuration of System Information (SI). Alternatively, an indicator indicating a preamble may be transmitted to a terminal by being included in a RACH configuration index which indicates a RACH resource.

Alternatively, since whether the system operates at below 6 GHz or above 6 GHz may be delivered to a base station and a terminal in advance through a broadcasting channel, the preamble format table may be simplified as shown in Table 4. Table 4 shows a preamble format table design of 18 cases.

mation is transmitted in a split manner (e.g., SIB1, SIB2, etc., in LTE). In this manner, a 5G system may also inform of frequency operation information prior to the SIB through which the RACH configuration is transmitted. In operation 503, the base station transmits the RACH configuration through the SIB. In operation 505, the base station knows an operating frequency in advance. In case of a system operating at above 6 GHz, when using a short sequence, a preamble format is selected in a subcarrier spacing of 60/120 kHz in operation 507. In case of a system operating at below 6 GHz, the preamble format is selected in a subcarrier

TABLE 4

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576k | 3168k | Type A, Type B |
| 1 | 839 | 1.25 kHz | 2*24576k | 21024k | Type A, Type B |
| 2 | 839 | 1.25 kHz | 4*24576k | 4688k | Type A, Type B |
| 3 | 839 | 5 kHz | 4*6144k | 3168k | Type A, Type B |
| 4(A0__15) | 139 | 15 kHz | 2048k | 144k | |
| 5 A1__(15/60) | 139 | 15 kHz | 2*2048k | 288k | |
| B1__(15/60) | 139 | 15 kHz | 6*2048k | 504k | |
| 6 A2__(15/60) | 139 | 15 kHz | 4*2048k | 576k | |
| B2__(15/60) | 139 | 15 kHz | 4*2048k | 360k | |
| A3__(15/60) | 139 | 15 kHz | 6*2048k | 864k | |
| 7 B3__(15/60) | 139 | 15 kHz | 2*2048k | 216k | |
| 8(B4__15/60) | 139 | 15 kHz | 12*2048k | 936k | |
| 9(C0__15/60) | 139 | 15 kHz | 2048k | 1240k | |
| 10(C2__15/60) | 139 | 15 kHz | 4*2048k | 2048k | |
| 11(A0__30/120) | 139 | 30 kHz | 1024k | 72k | |
| 12 A1__(30/120) | 139 | 30 kHz | 1*2048k | 144k | |
| B1__(30/120) | 139 | 30 kHz | 1*2048k | 108k | |
| 13 A2__(30/120) | 139 | 30 kHz | 2*2048k | 288k | |
| B2__(30/120) | 139 | 30 kHz | 2*2048k | 180k | |
| 14 A3__(30/120) | 139 | 30 kHz | 3*2048k | 432k | |
| B3__(30/120) | 139 | 30 kHz | 6*2048k | 468k | |
| 15(B4__30/120) | 139 | 30 kHz | 6*2048k | 468k | |
| 16(C0__30/120) | 139 | 30 kHz | 1024k | 620k | |
| 17(C2__30/120) | 139 | 30 kHz | 2*2048k | 1024k | |
| 18 | N/A | | | | |
| ... | N/A | | | | |
| ... | N/A | | | | |
| ... | N/A | | | | |
| ... | N/A | | | | |
| ... | N/A | | | | |
| 31 | N/A | | | | |

As shown in Table 4, in case of a RACH preamble using a short sequence, {15/30} kHz is used only at below 6 GHz, and {60/120} kHz is used only at above 6 GHz. Thus, when operating at below 6 GHz, it is possible to identify {60/120} kHz. That is, case of a format 5, a preamble format having a subcarrier spacing of 15 kHz may be designated when operating at below 6 GHz, and a preamble format having a subcarrier spacing of 60 kHz may be designated when operating at above 6 GHz.

Figure 5:
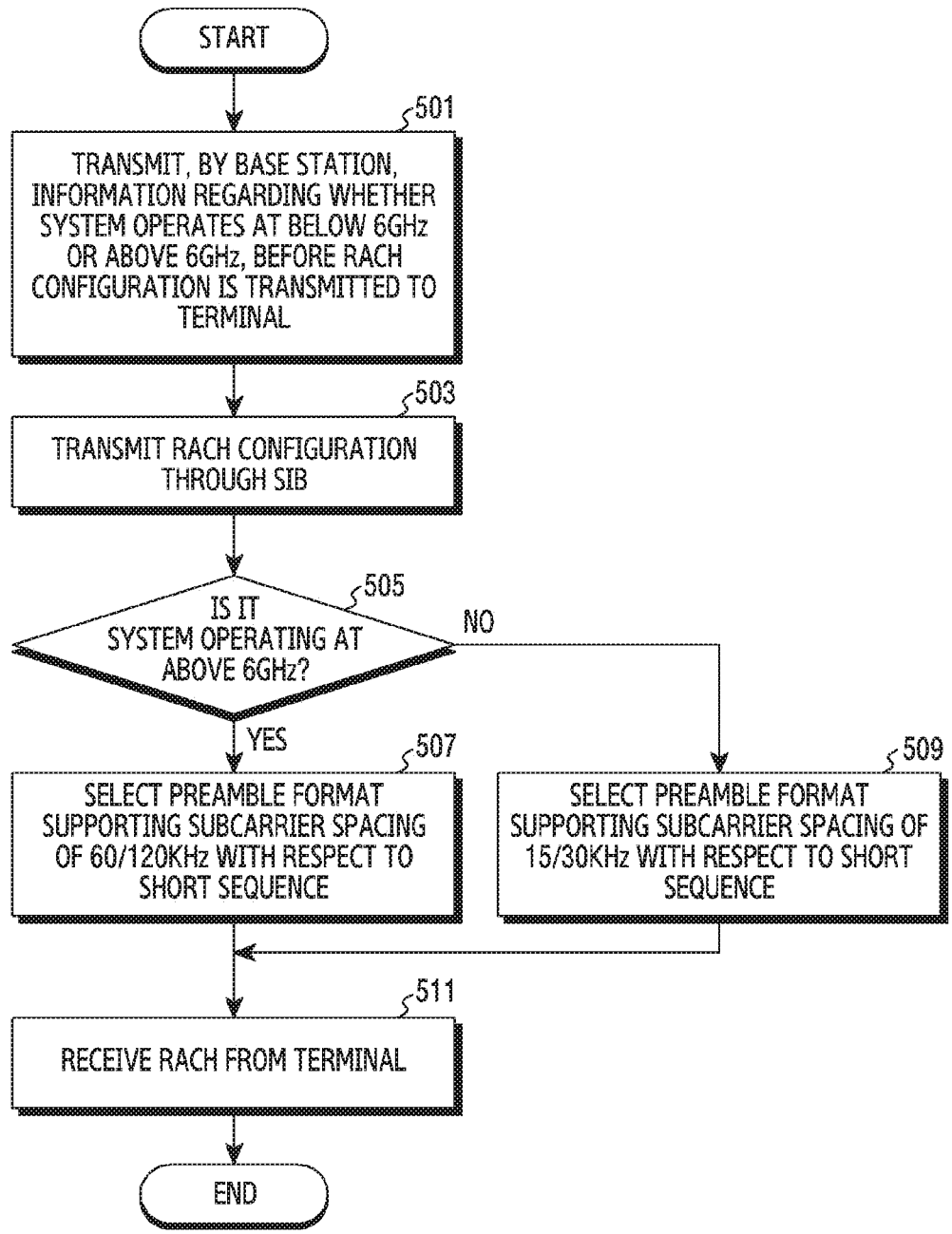
FIG. 5 is a flowchart illustrating an exemplary operation of a base station when a single preamble format table is used in a wireless communication system according to various embodiments of the present disclosure.
Figure 6:
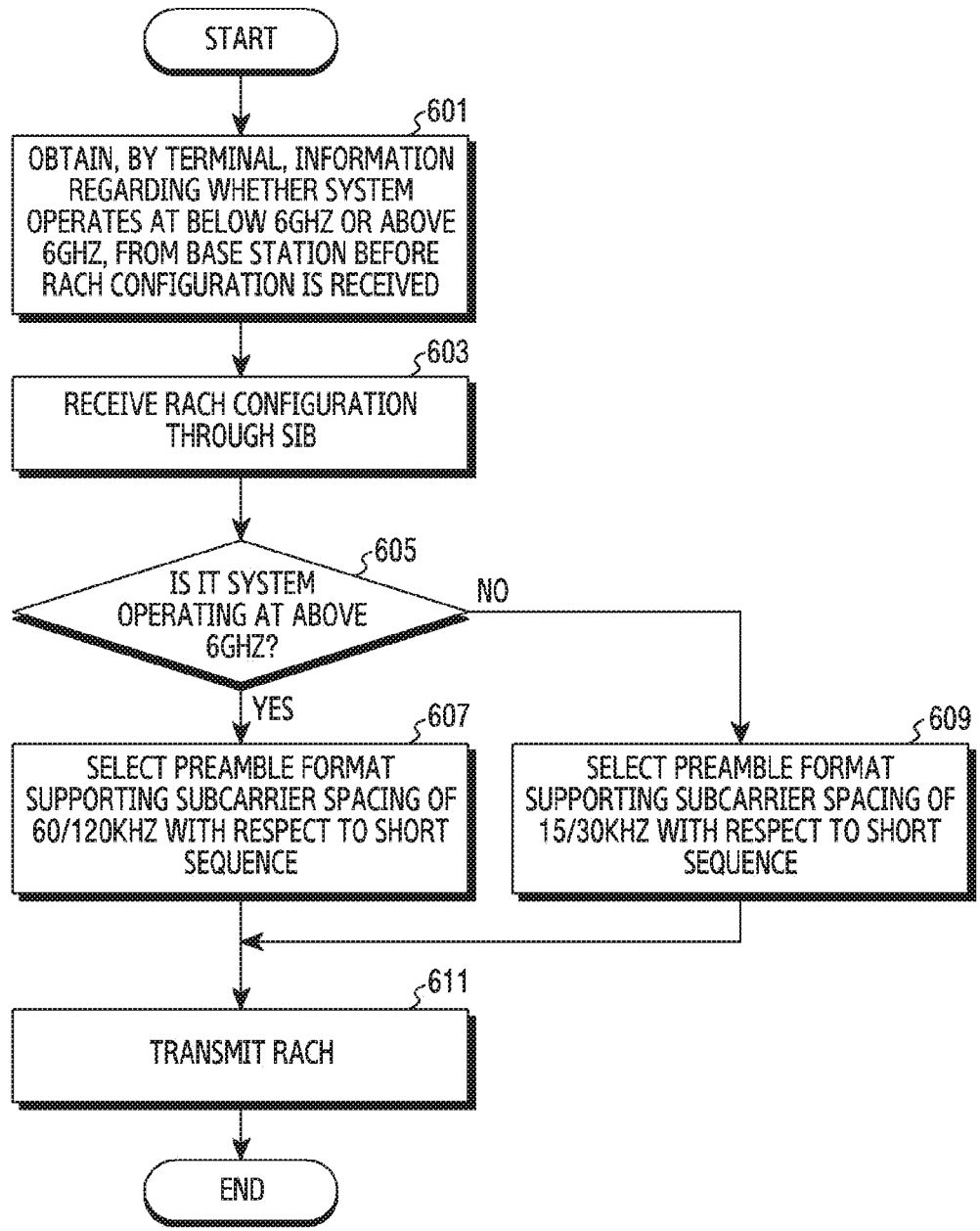
FIG. 6 is a flowchart illustrating an exemplary operation of a terminal when a single preamble format table is used in a wireless communication system according to various embodiments of the present disclosure.

FIG. 5 and FIG. 6 illustrate operations of a base station and a terminal when using the preamble format of Table 4. FIG. 5 is a flowchart illustrating an operation of a base station when a single preamble format table is used in a wireless communication system according to various embodiments of the present disclosure.

In operation 501 of FIG. 5, a base station informs a terminal of whether a system operates at below 6 GHz or above 6 GHz, before a RACH configuration is transmitted to the terminal. A signal for this may be informed through a Broadcast CHannel (BCH) or an SIB which is transmitted prior to an SIB through which the RACH configuration is transmitted. That is, a significantly great amount of information is to be transmitted through the SIB, and the inforspacing of 15/30 kHz in operation 509, and a RACH transmitted by the terminal is received in operation 511.

FIG. 6 is a flowchart illustrating an operation of a terminal when a single preamble format table is used in a wireless communication system according to various embodiments of the present disclosure.

In operation 601 of FIG. 6, a terminal receives from a base station whether a system operates at below 6 GHz or above 6 GHz, before a RACH configuration is received to the terminal. In operation 603, the terminal receives the RACH configuration through an SIB. In operation 605, the terminal may know an operating frequency in advance through operation 601. In case of a system operating at above 6 GHz, when using a short sequence, a preamble format is selected in a subcarrier spacing of 60/120 kHz in operation 607. In case of a system operating at below 6 GHz, the preamble format is selected in a subcarrier spacing of 15/30 kHz in operation 609, and a RACH transmitted by the terminal is transmitted in operation 611.

Meanwhile, as shown in Table 3 and Table 4, instead of a single table, a different preamble format table may be configured according to a sequence length. In Table 5 and Table 6, a different preamble format table is shown according to a sequence length. Table 5 shows a preamble format table for a sequence length of 839.

TABLE 5

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

Table 6 shows a preamble format table for a sequence length of 139.

TABLE 6

| Format | $L_{RA}$ | $\Delta f^{RA}$ | $N_u$ | $N_{CP}^{RA}$ |
|---|---|---|---|---|
| A0 | 139 | $15 \cdot 2^\mu$ kHz | $2048\kappa \cdot 2^{-\mu}$ | $144\kappa \cdot 2^{-\mu}$ |
| A1 | 139 | $15 \cdot 2^\mu$ kHz | $2 \cdot 2048\kappa \cdot 2^{-\mu}$ | $288\kappa \cdot 2^{-\mu}$ |
| B1 | 139 | $15 \cdot 2^\mu$ kHz | $2 \cdot 2048\kappa \cdot 2^{-\mu}$ | $216\kappa \cdot 2^{-\mu}$ |
| A2 | 139 | $15 \cdot 2^\mu$ kHz | $4 \cdot 2048\kappa \cdot 2^{-\mu}$ | $576\kappa \cdot 2^{-\mu}$ |
| B2 | 139 | $15 \cdot 2^\mu$ kHz | $4 \cdot 2048\kappa \cdot 2^{-\mu}$ | $360\kappa \cdot 2^{-\mu}$ |
| A3 | 139 | $15 \cdot 2^\mu$ kHz | $6 \cdot 2048\kappa \cdot 2^{-\mu}$ | $864\kappa \cdot 2^{-\mu}$ |
| B3 | 139 | $15 \cdot 2^\mu$ kHz | $6 \cdot 2048\kappa \cdot 2^{-\mu}$ | $504\kappa \cdot 2^{-\mu}$ |
| B4) | 139 | $15 \cdot 2^\mu$ kHz | $12 \cdot 2048\kappa \cdot 2^{-\mu}$ | $936\kappa \cdot 2^{-\mu}$ |
| C0 | 139 | $15 \cdot 2^\mu$ kHz | $2048\kappa \cdot 2^{-\mu}$ | $1240\kappa \cdot 2^{-\mu}$ |
| C2 | 139 | $15 \cdot 2^\mu$ kHz | $4 \cdot 2048\kappa \cdot 2^{-\mu}$ | $2048\kappa \cdot 2^{-\mu}$ |

In Table 6, a parameter 'u' is introduced to support a subcarrier spacing of (15/30/60/120) kHz. Herein, the parameter 'u' may have a length of 2 bits (0,1,2,3). That is, in case of u=0, a subcarrier spacing may be set to (15*2^(u=0)=15) kHz, and when u is 1, 2, or 3, it may indicate a subcarrier spacing of 30/60 or 120 kHz, respectively.

Figure 7:
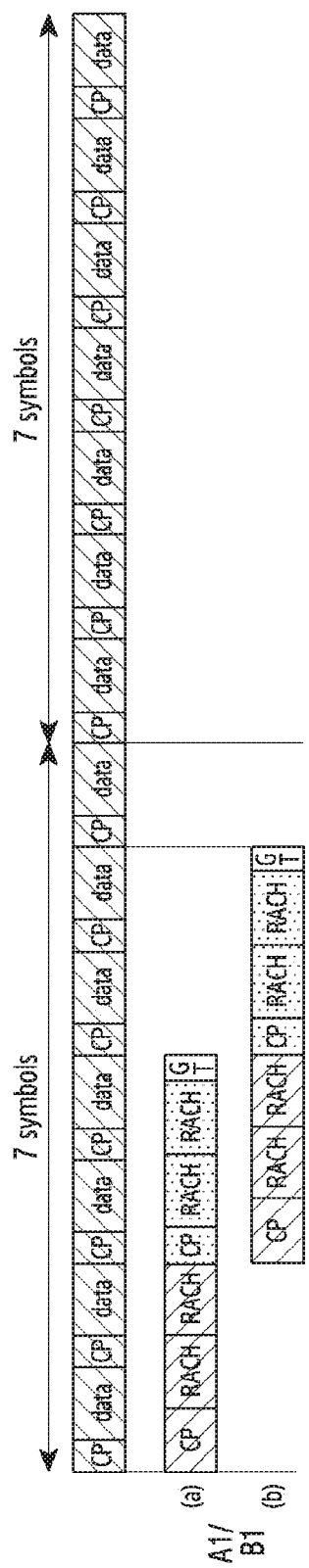
FIG. 7 illustrates an exemplary pattern of a format A1/B1 positioned in a slot when it is transmitted in a wireless communication system according to various embodiments of the present disclosure.

The RACH preamble is allocated in a slot according to the aforementioned format. Herein, when it is allocated in the slot, there is a need to determine a start symbol from which a RACH is to be transmitted, a last symbol to which the RACH is to be transmitted or the like. FIG. 7 illustrates a pattern of a preamble format A1/B1 positioned in a slot when it is assigned. A pattern thereof positioned in a symbol '0' is illustrated in (a), and a pattern thereof positioned in a symbol '2' is illustrated in (b).

Figure 8:
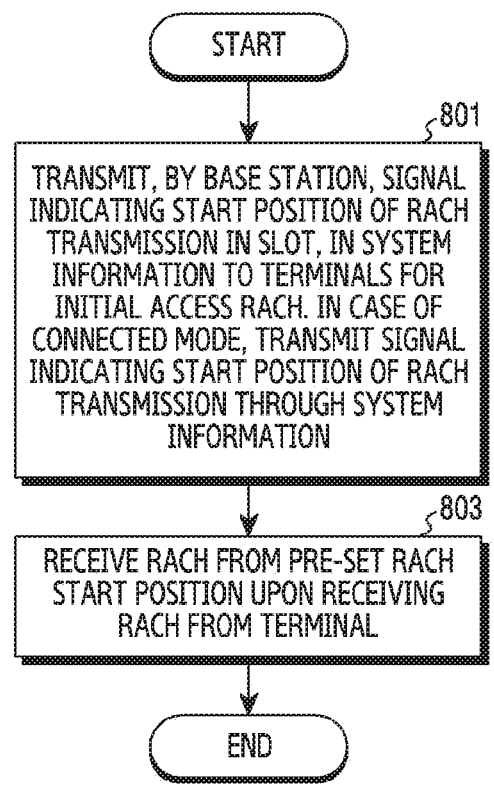
FIG. 8 is an exemplary flowchart illustrating an operation of a base station for Random Access CHannel (RACH) reception in a wireless communication system according to various embodiments of the present disclosure.
Figure 9:
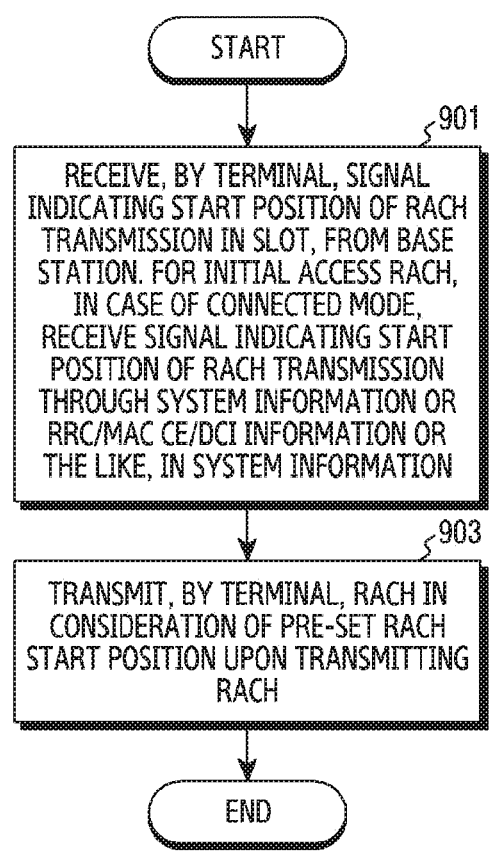
FIG. 9 is an exemplary flowchart illustrating an operation of a terminal for RACH transmission in a wireless communication system according to various embodiments of the present disclosure.

A position of a start symbol for RACH transmission may be informed by using a method of informing a start position through signaling or a method of fixing the position of the start symbol according to a Downlink (DL)/Uplink (UL) slot structure. In the first method, i.e., the method of informing the start position through signaling, is a method of informing the position of the start symbol of RACH transmission by using System Information (SI). A base station may inform a start position of the RACH and thus may assign RACH transmission as much as possible in one slot by transmitting a RACH from a symbol '0', thereby capable of maximizing efficiency of a beam sweeping operation. In addition, by assigning RACH transmission to a symbol '2' or another symbol 'n', a front portion of the slot may also be used for control information delivery. FIG. 8 and FIG. 9 illustrate an operation of a base station and terminal which transmit/receive a RACH based on a start symbol position.

In operation 801 of FIG. 8, a base station informs a terminal, through signaling, of a specific symbol, from which a RACH is to be transmitted, in a slot. Herein, signaling for initial access RA may be transmitted in system information (e.g., a RACH configuration), and signaling for connected mode RA may be informed through system information or a UE-specific signal (e.g., Radio Resource Control (RRC)/Media Access Control (MAC) Control Element (CE)/Downlink Control Information (DCI)). In operation 803, the base station receives the RACH transmitted by terminals from a start position of an allocated RACH.

In operation 901 of FIG. 9, a terminal knows a specific symbol, from which a RACH is to be transmitted, in a slot from a base station through signaling. Herein, signaling for initial access RA may be received from system information (e.g., a RACH configuration), and signaling for connected mode RA may be received through system information or a UE-specific signal (e.g., RRC/MAC CE/DCI). In operation 903, the terminal transmits the RACH by considering the start position of the allocated RACH and an association between a synchronization signal block (SSB) and a RACH resource.

In another method of informing a start position of a symbol for RACH transmission, a start position of the symbol is fixed according to a slot structure. That is, the RACH may be transmitted in a symbol index '0' in a UL-only slot, and the RACH may be transmitted in a symbol index '2' in a UL/DL-mixed slot. In addition, in the UL/DL-mixed slot, the symbol index needs to consider the number (1, 2, or 3) of symbols to which a PDCCH can be allocated. Therefore, after RACH allocation is finished (in a symbol n), one symbol duration is inserted as a guard interval, and thereafter the RACH may be transmitted from a symbol (n+1).

Figure 10:
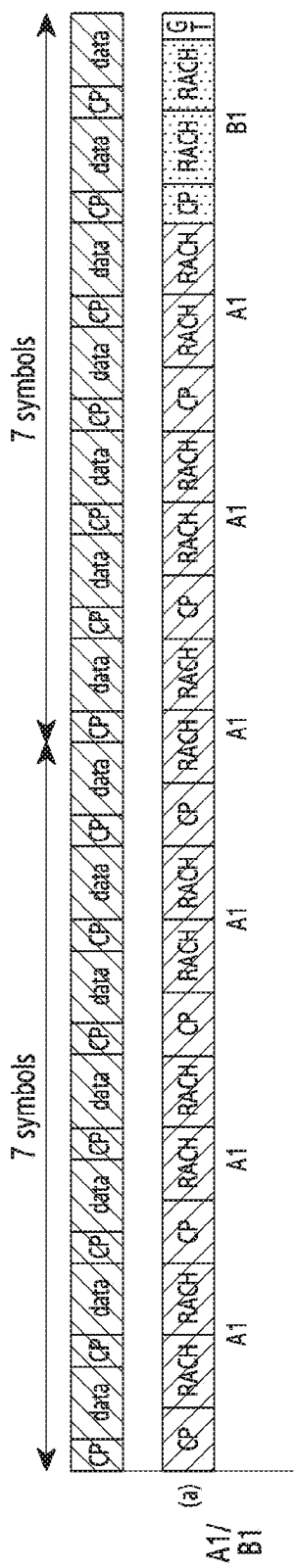
FIG. 10 illustrates an exemplary RACH transmission when a last position of a symbol is not informed in a wireless communication system according to various embodiments of the present disclosure.

FIG. 10 illustrates RACH transmission when a last position of a symbol is not informed in a wireless communication system according to various embodiments of the present disclosure.

A method of informing a last position of a symbol for RACH transmission is described hereinafter. As shown in FIG. 10, if there is only a position of a start symbol, a terminal may transmit a preamble format one time from the start position as shown in FIG. 10, or may infer a RACH resource position in a slot according to an association with SSB under the assumption that all symbols in the slot are symbols for an RACH. That is, as shown in FIG. 10, when assuming a format A1/B1, it may be considered that al is allocated from a first symbol in a slot, and thus six preamble formats A1 may be transmitted in the slot and one preamble format B1 may be transmitted in a last position of the slot. The terminal may recognize that there are seven RACH transmission occasions, and may transmit the RACH after selecting one of them according to an association of an SSB and seven RACH resources.

Figure 11:
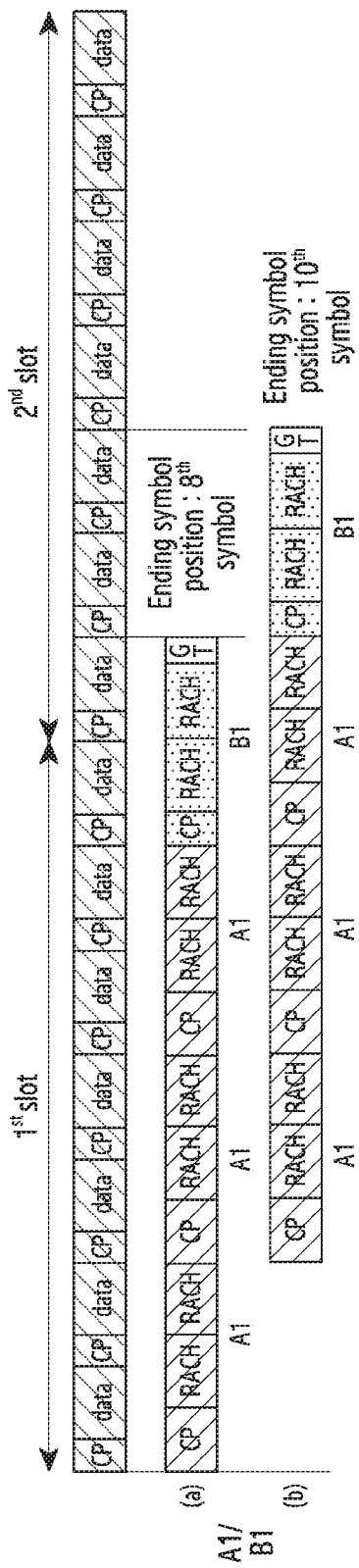
FIG. 11 illustrates another exemplary RACH transmission when a last position of a symbol is not informed in a wireless communication system according to various embodiments of the present disclosure.

FIG. 11 illustrates another RACH transmission when a last position of a symbol is not informed in a wireless communication system according to various embodiments of the present disclosure. As shown in FIG. 11, a terminal may be informed of a last symbol of an RACH, so that a resource prior to a last symbol is allocated to a format B. The format B is positioned at the end because the RACH is transmitted by the terminal without consideration of timing advance and thus a propagation delay must be considered as much as a round trip. By informing the last symbol position of RACH transmission, other symbols in a slot may be utilized for a PUSCH/PUCCH or the like.

Figure 12:
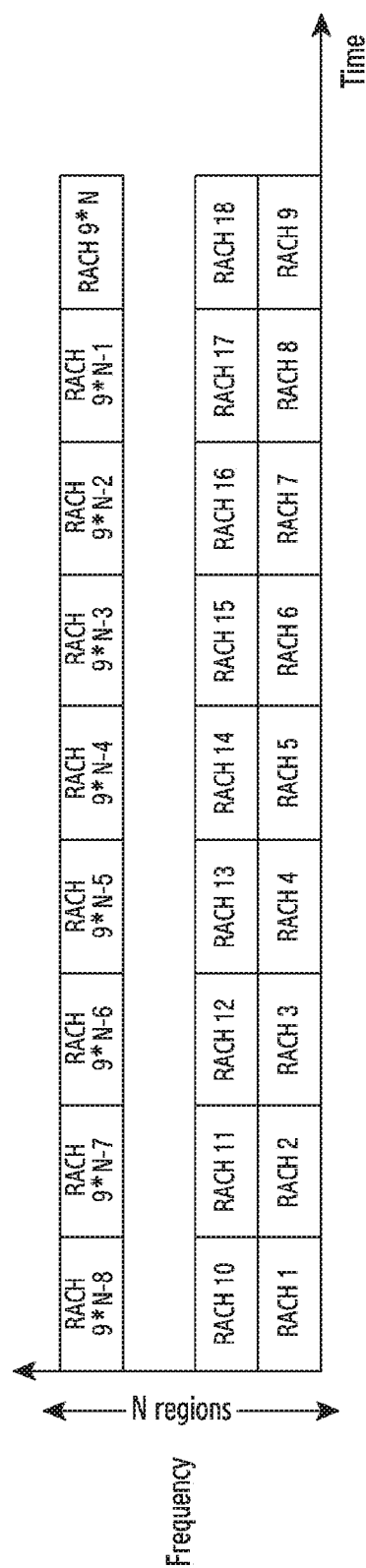
FIG. 12 illustrates an exemplary RACH resource extended by N times depending on N frequency resources in a wireless communication system according to various embodiments of the present disclosure.

FIG. 12 illustrates a RACH resource extended by N times depending on N frequency resources in a wireless communication system according to various embodiments of the present disclosure.

When a RACH is deployed in a slot, although the RACH is allocated in a split manner in a time domain in the aforementioned embodiments, the RACH may also be allocated by being extended to a frequency domain. That is, if N frequency resources to be allocated to the RACH are ensured, there is an effect in that RACH capacity can be increased by N times. FIG. 12 illustrates an effect of RACH capacity enhanced by N times on the basis of the number N of frequency resources. In FIG. 12, a terminal may know how many resources are allocated to a time axis through a start symbol and last symbol of a RACH resource in a slot. In addition, upon receiving a signal indicating the number N of frequency resources, as shown in FIG. 12, it is possible to know RACH resources extended by N times in a frequency axis. The signal indicating the number N of frequency resources may be delivered in a RACH configuration of system information for initial access RA, and may be delivered in system information or RRC/MAC CE/DCI as a UE-specific signal for a terminal in a connected mode. Herein, the terminal and a base station first allocate an index of a RACH resource in the time axis, and extend it to the frequency axis after the index allocation in the time axis is complete. Such a resource index mapping rule is required because a Random Access-Radio Network Temporary Identity (RA-RNTI) can be calculated based on a resource index when calculating the RA-RNTI.

Figure 13:
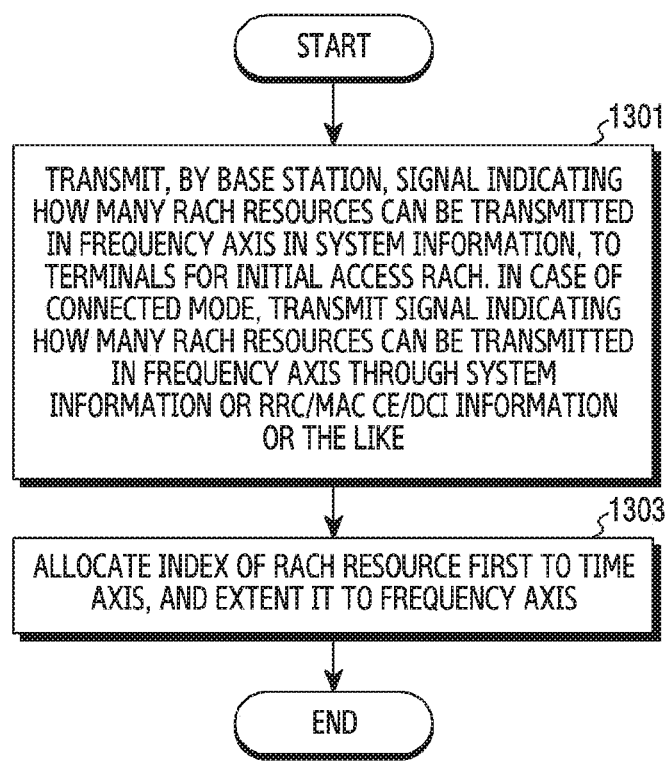
FIG. 13 is an exemplary flowchart illustrating an operation of a base station for a RACH resource extended by N times on the basis of N frequency resources in a wireless communication system according to various embodiments of the present disclosure.
Figure 14:
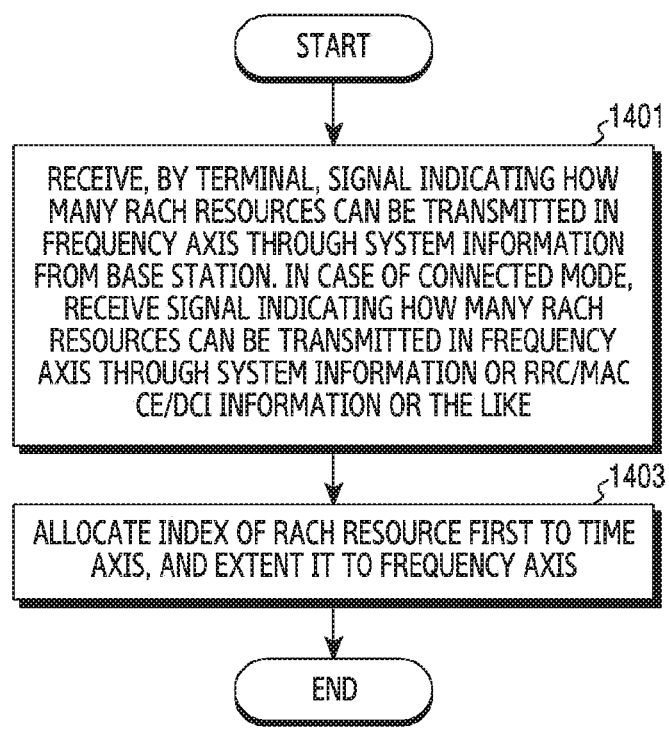
FIG. 14 is an exemplary flowchart illustrating an operation of a terminal for a RACH resource extended by N times on the basis of N frequency resources in a wireless communication system according to various embodiments of the present disclosure.

FIG. 13 and FIG. 14 illustrate exemplary methods in which a base station and a terminal allocate a RACH resource according to the number N of frequency resources. FIG. 13 is a flowchart illustrating an operation of a base station for a RACH resource extended by N times on the basis of N frequency resources in a wireless communication system according to various embodiments of the present disclosure.

In operation 1301 of FIG. 13, a base station informs a terminal, through signaling, of how many RACH resources can be transmitted in a frequency axis. Herein, signaling for initial access RA may be transmitted in system information (e.g., a RACH configuration), and signaling for connected mode RA may be informed through system information or a UE-specific signal (e.g., RRC/MAC CE/DCI). In operation 1303, the base station first allocates an index of the allocated RACH resource in a time axis, and there extends the index in the frequency axis.

FIG. 14 is a flowchart illustrating an operation of a terminal for a RACH resource extended by N times on the basis of N frequency resources in a wireless communication system according to various embodiments of the present disclosure.

In operation 1401 of FIG. 14, a terminal is informed from a base station, through signaling, of how many RACH resources can be transmitted in a frequency axis. Herein, signaling for initial access RA may be transmitted in system information (e.g., a RACH configuration), and signaling for connected mode RA may be informed through system information or a UE-specific signal (e.g., RRC/MAC CE/DCI). In operation 1403, the terminal first allocates an index of the allocated RACH resource in a time axis, and there extends the index in the frequency axis.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

In the aforementioned specific embodiments of the present disclosure, a component included in the disclosure is expressed in a singular or plural form according to the specific example embodiment proposed herein. However, the singular or plural expression is selected properly for a situation proposed for the convenience of explanation, and thus the various embodiments of the present disclosure are not limited to a single or a plurality of components. Therefore, a component expressed in a plural form can also be expressed in a singular form, or vice versa.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a master information block (MIB) on a frequency range, wherein the frequency range is one of a first frequency range or a second frequency range;
receiving, from the base station, a system information block (SIB) based on the MIB, the SIB including first information indicating a number of physical random access channel (PRACH) transmission occasions in a frequency domain, second information indicating a preamble format of a PRACH, and third information indicating a subcarrier spacing (SCS) of the PRACH;
in case that the frequency range is the first frequency range, identifying a first preamble format corresponding to the first frequency range based on the second information and identifying a first SCS;

in case that the frequency range is the second frequency range, identifying a second preamble format corresponding to the second frequency range based on the second information and identifying a second SCS, wherein the second frequency range is different from the first frequency range and the second preamble format is different from the first preamble format; and transmitting, to the base station, the PRACH based on the identified first preamble format and the identified first SCS or based on the identified second preamble format and the identified second SCS, and based on the first information and third information, wherein the first SCS is one of 15 kHz or 30 kHz, and the second SCS is one of 60 kHz or 120 kHz.

2. The method of claim 1, wherein the SIB includes PRACH frequency resources, and wherein the PRACH frequency resources are numbered starting from a low frequency.

3. The method of claim 2, wherein the PRACH is transmitted on a PRACH occasion associated with a synchronization signal block, SSB, among the PRACH transmission occasions, and wherein an index of the PRACH occasion is used to determine a random access-radio network temporary identity (RA-RNTI).

4. The method of claim 1, wherein transmitting the PRACH comprises transmitting the PRACH based on an association between a synchronization signal block (SSB) and a PRACH resource.

5. The method of claim 1, wherein the second information further indicates a number of the PRACH transmission occasions in a time domain.

6. A terminal in a wireless communication system, the terminal comprising:

a transceiver; and at least one processor coupled to the transceiver, the at least one processor configured to:

receive, from a base station, a master information block (MIB) on a frequency range, wherein the frequency range is one of a first frequency range or a second frequency range;

receive, from the base station, a system information block (SIB) based on the MIB, the SIB including first information indicating a number of physical random access channel (PRACH) transmission occasions in a frequency domain, second information indicating a preamble format of a PRACH, and third information indicating a subcarrier spacing (SCS) of the PRACH;

in case that the frequency range is the first frequency range, identify a first preamble format corresponding to the first frequency range based on the second information and identify a first SCS;

in case that the frequency range is the second frequency range, identify a second preamble format corresponding to the second frequency range based on the second information and identify a second SCS, wherein the second frequency range is different from the first frequency range and the second preamble format is different from the first preamble format; and transmit, to the base station, the PRACH based on the identified first preamble format and the identified first SCS or based on the identified second preamble format and the identified second SCS, and based on the first information and third information, wherein the first SCS is one of 15 kHz or 30 kHz, and the second SCS is one of 60 kHz or 120 kHz.

7. The terminal of claim 6, wherein the SIB includes a plurality of PRACH frequency resources, and wherein the PRACH frequency resources are numbered starting from a low frequency.

8. The terminal of claim 7, wherein the PRACH is transmitted on a PRACH occasion associated with a synchronization signal block, SSB, among the PRACH transmission occasions, and wherein an index of the PRACH occasion is used to determine a random access-radio network temporary identity (RA-RNTI).

9. The terminal of claim 6, wherein the at least one processor is further configured to transmit the PRACH based on an association between a synchronization signal block (SSB) and a PRACH resource.

10. The terminal of claim 6, wherein the second information further indicates a number of the PRACH transmission occasions in a time domain.

11. A base station in a wireless communication system, the base station comprising:

a transceiver; and at least one processor coupled to the transceiver and configured to:

transmit, to a terminal, a master information block (MIB) on a frequency range, wherein the frequency range is one of a first frequency range or a second frequency range;

transmit, to the terminal, a system information block (SIB) based on the MIB, the SIB including first information indicating a number of a physical random access channel (PRACH) transmission occasions in a frequency domain, second information indicating a preamble format of a PRACH, and third information indicating a subcarrier spacing (SCS) of the PRACH; and receive, from the terminal, the PRACH based on the SIB, wherein, in case that the frequency range is the first frequency range, a first preamble format corresponding to the first frequency range is identified based on the second information and a first SCS is identified, wherein, in case that the frequency range is the second frequency range, a second preamble format corresponding to the second frequency range is identified based on the second information and a second SCS is identified, wherein the second frequency range is different from the first frequency range and the second preamble format is different from the first preamble format, wherein the first SCS is one of 15 kHz or 30 kHz, and the second SCS is one of 60 kHz or 120 kHz.

12. The base station of claim 11, wherein the SIB includes PRACH frequency resources, and wherein the PRACH frequency resources are numbered starting from a low frequency.

13. The base station of claim 12, wherein the PRACH is transmitted on a PRACH occasion associated with a synchronization signal block, SSB, among the PRACH transmission occasions, and wherein an index of the PRACH occasion is used to determine a random access-radio network temporary identity (RA-RNTI).

14. The base station of claim 11, wherein the second information further indicates a number of the PRACH transmission occasions in a time domain.

* * * * *